United States Patent [19]

Everett

[11] 4,356,894
[45] Nov. 2, 1982

[54] HIGH VEHICLE DRIVER MOUNT AND DISMOUNT LIFT

[76] Inventor: Kenneth Everett, 186 Rose Bud La., San Antonio, Tex. 78221

[21] Appl. No.: 217,416

[22] Filed: Dec. 17, 1980

[51] Int. Cl.$^3$ .............................................. B66B 9/20
[52] U.S. Cl. .................................... 187/9 R; 280/166
[58] Field of Search ................ 187/9 R, 17; 280/163, 280/166, 165; 414/921

[56] References Cited

U.S. PATENT DOCUMENTS 3,528,574 9/1970 Denner et al. ...................... 280/166
3,986,724 10/1976 Rivinius ............................... 280/166

Primary Examiner—Joseph J. Rolla
Assistant Examiner—Kenneth Noland
Attorney, Agent, or Firm—Harvey B. Jacobson

[57] ABSTRACT

A vertically elongated mount is provided and supported from a tractor vehicle of the cab over engine type closely behind and spaced slightly inwardly of the front wheel of the tractor on the driver's side thereof. An elongated support arm is provided and has a first end portion pivotally supported from the lower end portion of the mount for angular displacement of the arm about a horizontal axis extending transversely of the arm and in a front to rear direction relative to the tractor. The arm is swingable between a lowered generally horizontally position with the second end portion of the arm projecting horizontally outwardly from the mount behind and slightly outwardly of the outer side of the wheel and a raised position with the second end portion of the arm projecting upwardly and outwardly from the mount to a position generally horizontally aligned with the upper periphery of the wheel and recessed slightly inwardly of the outer side thereof, and an extendible and retractable fluid cylinder is provided and has one end pivotally attached to the upper end portion of the mount and the other end pivotally anchored to the arm intermediate with the first and second end portions thereof. The cylinder is operative, upon extension and retraction thereof, to swing the arm between its lowered and raised positions.

6 Claims, 2 Drawing Figures

U.S. Patent Nov. 2, 1982 4,356,894
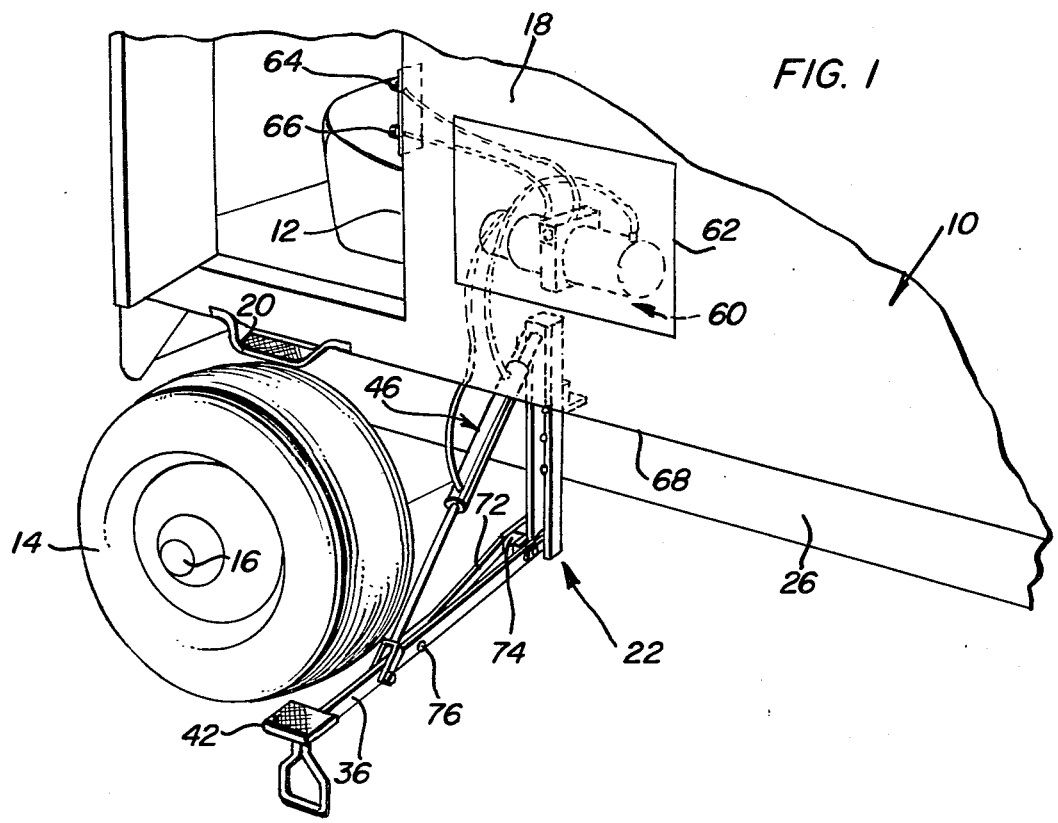
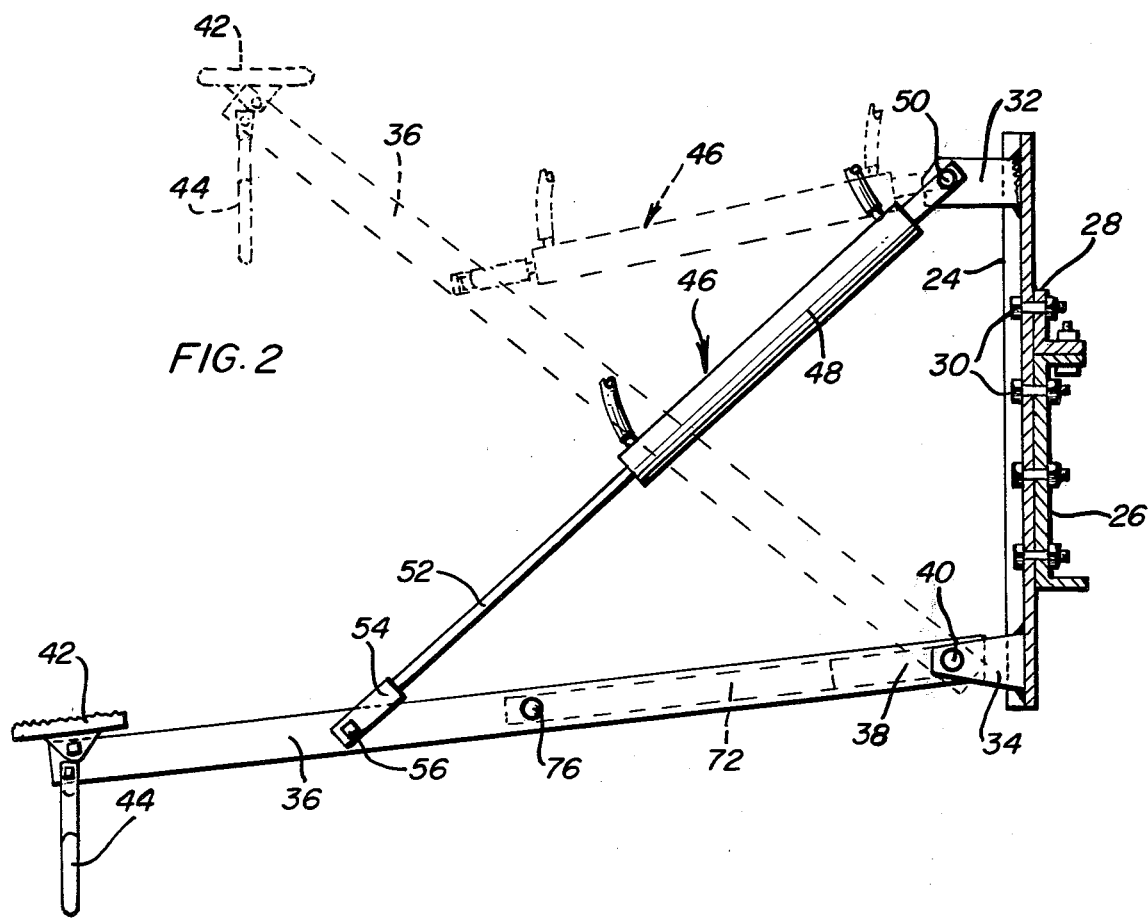

HIGH VEHICLE DRIVER MOUNT AND DISMOUNT LIFT

BACKGROUND OF THE INVENTION

Various forms of mounting and dismounting steps heretofore have been provided for vehicles whose operator's stations are spaced appreciably above the ground. In addition, some of these previously known forms of steps are constructed in a manner specifically designed to be utilized in conjunction with the elevated driver's cab of a "cab over engine" truck vehicle. However, even the steps specifically designed for use in conjunction "cab over engine" trucks are not inclusive of structure or so mounted on the related truck whereby the step is positioned in a horizontally outwardly projecting lowered position and an inwardly recessed upper position when the step is shifted between its lowered and uppermost positions. In addition, some of these previously known forms of steps are constructed in a manner whereby they must be specifically adapted for use in conjunction with a particular type of "cab over engine" truck.

Accordingly, a need exists for a mount and dismount lift-type step for use in conjunction with "cab over engine" trucks and which may be readily mounted on numerous different trucks of this type without extensive modification to the truck or to the step and which will also enable the step to be exposed outwardly of the corresponding side of the associated truck when in a lowered position and yet recessed inwardly of the corresponding truck side when in a raised position.

Examples of previously known forms of mount and dismount steps including some of the general structural and operational features of the instant invention are disclosed in U.S. Pat. Nos. 3,903,981, 3,951,431, 3,986,724 and 4,071,260.

BRIEF DESCRIPTION OF THE INVENTION

The mount and dismount lift step of the instant invention has been specifically designed for use in conjunction with a "cab over engine" truck wherein the driver, when either dismounting or mounting his vehicle, may be provided a secure step. The instant invention is constructed in a manner whereby the step provided is shifted to a lowered outwardly projecting position immediately prior to the driver attempting to mount his vehicle and during the latter part of dismounting of the driver from his vehicle and a raised inwardly recessed position as the driver of the vehicle has substantially completed mounting his vehicle or is preparing to dismount therefrom.

The step includes motor structure for raising and lowering a supported step member through the utilization of a compressed fluid system and is further constructed in a manner whereby it may be readily mounted upon a large number of "cab over engine" vehicles presently existing and being manufactured.

The main object of this invention is to provide an operator mount and dismount step for "cab over engine" vehicles and which includes a power lift system whereby the driver of such a vehicle may safely mount and dismount his vehicle with reduced effort.

Another object of the this invention is to provide a step in accordance with the preceding objects and constructed in a manner whereby the step may be readily mounted on many presently existing and manufactured "cab over engine" trucks.

Still another object of this invention is to provide a mount and dismount step which is wholly recessed within the corresponding peripheral side area of the associated truck when the step is in its raised position.

Another object of this invention, in accordance with the immediately preceding object, is to provide a step which is disposed in a slightly outwardly projecting position relative to the associated side of the vehicle when the step is in the lowered position.

A final object of this invention to be specifically enumerated herein is to provide a step in accordance with the preceding objects and which will conform to conventional forms of manufacture, be of simple construction and easy to use, so as to provide a device that will be economical feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the forward driver's side portion a conventional form of "cab over engine" vehicle with the step of the instant invention operatively associated therewith and the step illustrated in a lowered position; and FIG. 2 is an enlarged, fragmentary, transverse vertical sectional view illustrating the manner in which the step is supported from the adjacent frame rail of the truck and with the raised position of the step being illustrated in phantom lines.

DETAILED DESCRIPTION OF THE INVENTION

Referring now more specifically to the drawings, the numeral 10 generally designates a conventional form of "cab over engine" vehicle wherein the entrance doorway 12 for the driver of the vehicle is disposed above the left front wheel 14 of the vehicle. The front wheel 14 includes a central hub portion 16 and the cab 18 of the vehicle 10 includes a step 20 supported therefrom immediately below the lower marginal portion of the doorway 12 and above the upper periphery of the front wheel 14. However, in order for a driver of the vehicle 10 to engage a foot with the step 20 during the process of mounting the vehicle 10, the other foot of the driver must first be engaged with the hub 16 in order that the driver may elevate himself to approximately mid-wheel height before engaging the step 20. In addition, when a driver dismounts from the vehicle 10, after first engaging the step 20 with one foot, his other foot must be engaged with the hub 16. Inasmuch as the hub 16 comprises a rounded surface and may be wet due to inclimate weather, many accidents occur as a driver transfers his weight to and from the hub 16 when mounting or dismounting the vehicle 10.

In order to prevent such accidents, the step of the instant invention has been provided. The step is generally referred to by the reference numeral 22 and includes an upstanding channel-shaped mount 24 secured to the outer side of the adjacent frame rail 26 through the utilization of an angle bracket 28 and fasteners 30. The mount projects above the frame rail 26 and also slightly below the latter. The upper end of the channel member has an apertured mounting lug 32 secured therein and the lower end of the mount 24 has an apertured mounting lug 34 secured therein.

An elongated support arm 36 has one end portion 38 pivotally supported from the lower mounting lug 34 by a pivot fastener 40. The second end of the support arm 36 supports an upwardly facing step member 42 therefrom and may also be equipped with a depending stirrup 44.

An extendible fluid cylinder generally referred to by the reference number 46 has one base end portion of its cylinder portion 48 pivotally anchored relative to the upper mounting lug 32 by a pivot fastener 50 and the free end of the piston portion 52 of the cylinder 46 includes a bifurcated terminal end 54 which is pivotally anchored to the support arm 36 by a pivot fastener 56. The pivot fastener 56 is spaced inwardly of the outer free end of the support arm 36 and the step member 42 supported therefrom. The cylinder 46 comprises a hydraulic cylinder, although an air cylinder may be used, and is operatively connected to an electric motor powered hydraulic pump system referred to in general by the reference numeral 60 recessed inwardly of a storage compartment 62 on the vehicle 10. The hydraulic pump system 60 may be of any conventional design and is actuated, reversely, by a pair of control buttons 64 and 66 within the cab 18 adjacent the rear marginal edge of the doorway 12. The button 66 may be depressed in order to cause the cylinder 46 to retract and the button 64 may be depressed to cause the cylinder 46 to be extended.

The support arm 36, when the cylinder 46 is extended and retracted, is positioned in the solid and phantom line positions, respectively, illustrated in FIG. 2 of the drawings. When the support arm 36 is in the solid line position of FIG. 2, the step member 42 is disposed at approximately mid-height of the wheel 14 and projects slightly outwardly of the outer side of the wheel 14 with the arm 36 spaced closely rearwardly of the wheel 14. However, when the support arm 36 is in the phantom line position thereof illustrated in FIG. 2, the step member 42 is raised to an elevation substantially horizontally aligned with the upper peripheral portion of the wheel 14 and is spaced inwardly of the outer side of the wheel 14 immediately beneath the adjacent lower marginal edge 68 of the cab 18. Thus, when the vehicle 10 is being operated, the step member 42 is disposed in a raised and inwardly recessed position. When a driver wishes to dismount the truck 10, he places his left foot on the step 20 and his right foot on the step member 42 and thereafter pushes the button 64 whereby the step member 42 will be lowered to the solid line position thereof illustrated in FIGS. 1 and 2 of the drawings. Thereafter, the driver may readily place his left foot upon the ground. When it is desired to mount the vehicle 10, the driver first places his right foot on the step member 42, thereafter pushes the button 66 and after the support arm 36 has been raised to the phantom line position of FIG. 2 of the drawings, the driver may then place his left foot upon the step 20 and subsequently enter the cab 18.

The step 22 includes an angled brace member 72 having one end pivotally attached to the forward side of the lower mounting lug 34 through the utilization of a spacer 74 and the pivot fastener 40 and the other end of the brace member 72 is anchored to the longitudinal midportion of the support arm 36 by a fastener 76. Thus, front to rear lateral shifting of the free end of the support arm 36 is prevented, whereby the step member 42 provides a secure and stable step upon which the driver of the vehicle 10 may support his weight while being raised or lowered.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a tractor vehicle of the cab over engine type wherein the driver entrance and exit opening is disposed above a front wheel of the vehicle and said vehicle includes a stationary step generally centered above said wheel spaced at considerable height above the ground surface upon which the front wheel of the vehicle rests, and wherein the vehicle includes an elongated longitudinally extending side main frame member disposed at an elevation above and below a comfortable step up from the ground and a comfortable step up to the stationary step, a vertically elongated mount supported from said main frame member closely behind and inwardly of said front wheel and including upper and lower end portions projecting above and below said main frame member, an elongated support arm having a first end portion pivotally supported from the lower end portion of said mount for angular displacement about a horizontal axis extending transversely of said arm and in a front-to-rear direction relative to said vehicle, said arm being swingable between a lowered downwardly and outwardly inclined position with the second end portion of said arm projecting downwardly and outwardly from said mount lower end portion behind and slightly outwardly of the outer side of said wheel and a raised position with said second end portion of said arm inclined upwardly and outwardly from said mount to a level above said main frame member and generally horizontally aligned with the upper periphery of said wheel and spaced slightly below and rearward of said stationary step, and an extendible and retractable fluid cylinder having one end pivotally attached to the upper end portion of said mount and the other end pivotally anchored to said arm intermediate its first and second end portions and operative, upon extension and retraction, to swing said arm between said lowered and raised positions, respectively, the outer second end portion of said arm supporting an upwardly facing step member therefrom.

2. The combination of claim 1 wherein said fluid cylinder comprises a hydraulic cylinder.

3. The combination of claim 1 wherein said vertically elongated mount comprises an upstanding channel member in whose upper and lower ends apertured mounting lugs are anchored, said first end portion of said arm being pivotally attached to said lower mounting lug and said one end of said cylinder being pivotally attached to said upper mounting lug.

4. The combination of claim 1 wherein said one end portion of said arm includes an elongated brace member having one end pivotally attached to the lower end of said mount for angular displacement about the first mentioned axis at a point spaced forwardly of said first end portion of said arm and the other end of said brace is securely anchored to said support arm intermediate its opposite end portion.

5. The combination of claim 4 wherein said vertically elongated mount comprises an upstanding channel member in whose upper and lower ends apertured mounting lugs are anchored, said first end portion of said arm being pivotally attached to said lower mounting lug and said one end of said cylinder being pivotally attached to said upper mounting lug.

6. The combination of claim 5 wherein said fluid cylinder comprises a hydraulic cylinder.

* * * * *